United States Patent
Padhye et al.

(10) Patent No.: US 8,020,017 B2
(45) Date of Patent: Sep. 13, 2011

(54) MANAGEMENT OF POWER DOMAINS IN AN INTEGRATED CIRCUIT

(75) Inventors: Milind P. Padhye, Austin, TX (US); Noah W. Bamford, Austin, TX (US); Anuj Singhania, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 476 days.

(21) Appl. No.: 12/192,683

(22) Filed: Aug. 15, 2008

(65) Prior Publication Data

US 2010/0042858 A1    Feb. 18, 2010

(51) Int. Cl.
*G06F 1/26* (2006.01)
(52) U.S. Cl. .................. 713/323; 713/300
(58) Field of Classification Search ........... 713/300, 713/323
See application file for complete search history.

(56) References Cited

U.S. PATENT DOCUMENTS

| | | | |
|---|---|---|---|
| 7,162,654 B1 * | 1/2007 | Price | 713/320 |
| 2003/0204757 A1 * | 10/2003 | Flynn | 713/310 |
| 2006/0184808 A1 * | 8/2006 | Chua-Eoan et al. | 713/300 |
| 2006/0225046 A1 * | 10/2006 | Feekes, Jr. | 717/127 |
| 2007/0240001 A1 * | 10/2007 | Syed et al. | 713/300 |
| 2009/0168462 A1 * | 7/2009 | Schopfer et al. | 363/21.01 |

* cited by examiner

*Primary Examiner* — Glenn A Auve
(74) *Attorney, Agent, or Firm* — David G. Dolezal

(57) ABSTRACT

A method of operating a circuit, including operating in a first mode, wherein in the first mode, a first power domain operates in an active power mode and a second power domain operates in an active power mode, wherein in the first mode, a first set of at least one terminal of a first circuit of the first power domain are coupled to a second set of at least one terminal of a second circuit of the second power mode via an isolation circuit for providing signals from the first circuit to the second circuit, is provided. The method further includes operating the circuit in a second mode, wherein in the second mode, the first power domain operates in a power gated mode and a second power domain operates in an active power mode.

19 Claims, 3 Drawing Sheets

MANAGEMENT OF POWER DOMAINS IN AN INTEGRATED CIRCUIT

BACKGROUND

1. Field

This disclosure relates generally to power management, and more specifically, to systems and methods for power management related to power domains in an integrated circuit device.

2. Related Art

To manage power consumption by devices, such as processors, various modules may be in an active mode or in a standby mode. For example, in a wireless baseband processor, certain modules of the baseband processor may be in an active mode while certain other modules may be in standby mode. Moreover, among the modules that are in standby mode, a subset of the modules may be always alive whereas another subset may be power gated. The subset of the modules that are always alive are referred to as being in the alive domain and the subset of the modules that are power gated are referred to as being in the power gated domain.

Typically, isolation cells are used to isolate the alive domain from the power gated domain. Moreover, when the modules in a power gated domain are in a powered down state the outputs corresponding to these modules are isolated to a known fixed state. In a situation, where a processor or a core requests access to a module that is part of a power gated domain, the module responds with a fixed response. A typical response is an error signal. This fixed response results in inflexibility.

Accordingly, there is a need for power management related to power domains in a device.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
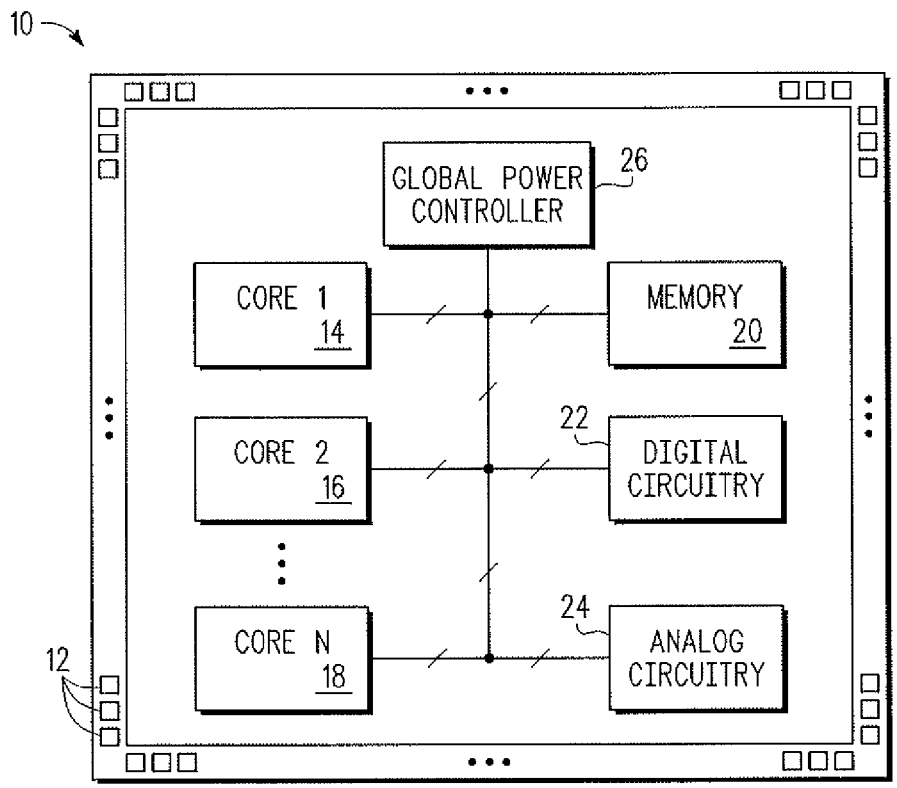
FIG. 1 is a block diagram of an exemplary device with power management.

In one aspect, a circuit including a first power domain, the first power domain including a first set at least one terminal, the first set of at least one terminal configured for providing signals, is provided. The circuit further includes a second power domain, the second power domain including a second set of at least one terminal, the second set configured for receiving signals, the first power domain is power gatable with respect to the second power domain. The circuit further includes a controller circuit, the controller circuit having a third set of at least one terminal for providing programmable values. The circuit further includes isolation circuitry having an input coupled to the first set of at least one terminal, a second input coupled to the third set of at least one terminal, and an output coupled to the second set of at least one terminal, the isolation circuitry including an input to receive an isolate signal, wherein the isolation circuit couples the first set of at least one terminal to the second set of at least one terminal to receive signals based on the isolation signal being in a first state and couples the third set of at least one terminal to the second set of at least one terminal to receive signals based on the isolation signal being at a second state.

In another aspect, a method of operating a circuit, including operating in a first mode, wherein in the first mode, a first power domain operates in an active power mode and a second power domain operates in an active power mode, wherein in the first mode, a first set of at least one terminal of a first circuit of the first power domain are coupled to a second set of at least one terminal of a second circuit of the second power mode via an isolation circuit for providing signals from the first circuit to the second circuit, is provided. The method further includes operating in a second mode, wherein in the second mode, the first power domain operates in a power gated mode and a second power domain operates in an active power mode, wherein in the second mode, the second set of at least one terminal is coupled to a third set of at least one terminal via the isolation circuit, wherein the first set of at least one terminal is not coupled to the second set of at least one terminal via the isolation circuit, wherein: (1) when operating in the first mode, the third set of at least one terminal is not coupled to the second set of at least one terminal via the isolation circuit; and (2) when operating in the second mode, the third set of at least one terminal provides via the isolation circuit to the second set of at least one terminal a first value at a first time and a second value at a second time.

In yet another aspect, a method of operating a circuit, including operating in a first mode, wherein in the first mode, a first power domain of the circuit operates in an active power mode and a second power domain of the circuit operates in an active power mode, wherein in the first mode, a first set of at least one terminal of a first circuit of the first power domain are coupled to a second set of at least one terminal of a second circuit of the second power domain via an isolation circuit for providing signal values from the first circuit to the second circuit, is provided. The method further includes transitioning from the first mode to a second mode, wherein the transitioning includes placing the isolation circuit in a mode to couple a third set of at least one terminal to the second set of at least one terminal and to decouple the first set of at least one terminal from the second set of at least one terminal and then placing the first power domain in a gated power mode. The method further includes operating in the second mode, wherein in the second mode, the first power domain operates in the power gated mode and a second power domain operates in an active power mode, wherein in the second mode, the second set of at least one terminal is coupled to the third set of at least one terminal via the isolation circuit, wherein the first set of at least one terminal is not coupled to the second set of at least one terminal via the isolation circuit, wherein: (1) when operating in the first mode, the third set of at least one terminal is not coupled to the second set of at least one terminal via the isolation circuit; and (2) when operating in the second mode, providing by the third set of at least one terminal via the isolation circuit to the second set of at least one terminal a first value at a first time and a second value at a second time. The method further includes transitioning from the second mode to the first mode, wherein the transitioning includes placing the first power domain in an active mode and then placing the isolation circuit in a mode to couple the first set of at least one terminal to the second set of at least one terminal and to decouple the third set of at least one terminal from the second set of at least one terminal.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In case of a negative logic signal, the signal is active low where the logically true state corresponds to a logic level zero. In case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

FIG. 1 is a block diagram of an exemplary device 10 with power management. Device 10 may include pads 12 for connecting device 10 to devices or circuits external to device 10. At least one of pads 12 may be used to couple a voltage supply, such as VDD to device 10. Device 10 may include various types of modules, including, for example, core 1 14, core 2 16, core N 18, memory 20, digital circuitry 22, analog circuitry 24, and global power controller 26. Core 1 14, core 2 16, and core N 18 may be separate processor cores that can perform various functions associated with device 10. By way of example, core 1 14 may correspond to a baseband processor core, core 2 16 may correspond to a digital signal processing core, and core N 18 may correspond to a radio frequency processing core, or an application core, or any other type of core. Any of these cores may be other types of processing cores, as well. Memory 20 may be memory that is on-chip memory, for example. Memory 20 may be read only memory, RAM, or any other type of memory. Digital circuitry 22 may correspond to logic that processes signals digitally. Analog circuitry 24 may correspond to logic that processes signals in the analog form. Although FIG. 1 shows a specific number of modules, such as processing cores, memory, digital circuitry, and analog circuitry, device 10 may include additional or fewer modules. Global power controller 26 may perform power management functions associated with device 10, including managing various power domains located on device 10.

Figure 2:
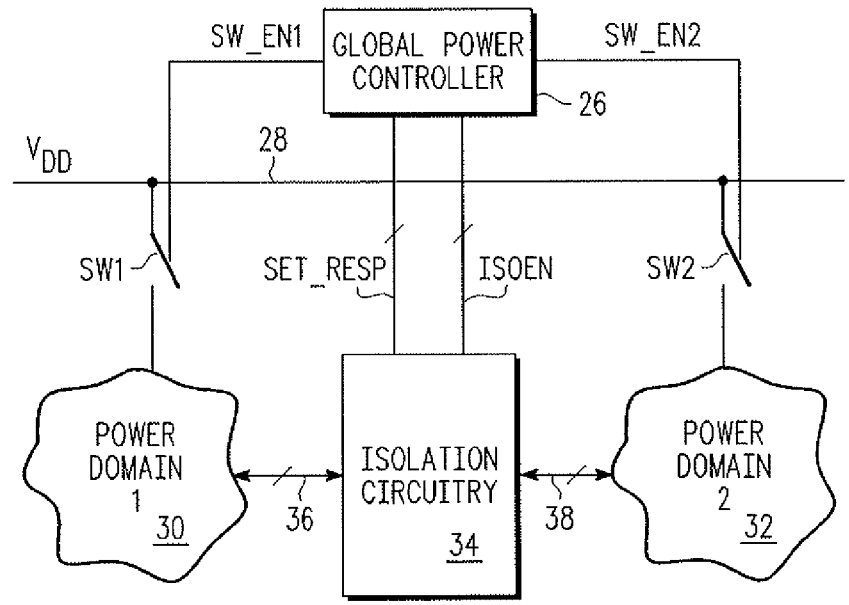
FIG. 2 is a block diagram of an exemplary power management system.

FIG. 2 is a block diagram of an exemplary power management system that may be implemented as part of device 10. Isolation circuitry 34 may be used to isolate power domain 1 30 from power domain 2 32. In one embodiment, each power domain may be controlled by global power controller 26 by asserting appropriate signals on bus 28. Moreover, since global power controller 26 is coupled to bus 28, it can receive appropriate signals as they are being passed from a master to a slave. Thus, for example, power supply VDD may be supplied via a power supply bus 28 to various parts of device 10. As noted earlier, power supply VDD may be coupled to device 10 via any of pads 12. In one embodiment, power supply VDD may be coupled to power domain 1 30 via switch SW1 and power supply VDD may be coupled to power domain 2 32 via switch SW2. Isolation circuitry 34 may be used to isolate power domain 1 30 from power domain 2 32. Global power controller 26 may provided various control signals to the elements shown in FIG. 2 to accomplish power management objectives. Referring still to FIG. 2, an ISOEN signal may enable isolation. The ISOEN signal may have a first state or a second state. In one state, for example, high state, the ISOEN signal may enable isolation. In another state, for example, low state, the ISOEN signal may disable isolation.

In one embodiment, global power controller 26 may include a state machine and corresponding registers. For example, global power controller 26 may include registers that store information concerning whether a particular module should generate an error in response to an access from the master or whether the particular module should wake up and respond to the master. Global power controller 26 may be implemented using other appropriate components, as well. By way of example, global power controller 26 may control switches SW1 and SW2. In addition, global power controller 26 may provide signals SET_RESP and ISOEN to isolation circuitry 34. In operation, global power controller may couple or decouple power supply VDD to power domain 1 30 and power domain 2 32, respectively, by closing or opening respective switches SW1 and SW2. SET_RESP signal may be issued in response to the power management requirements of a user application that is being executed by any of the cores located on device 10. In one embodiment, cores could be viewed as masters, whereas the other components located on device 10 may be viewed as slaves. Alternatively, even specific portions of cores may be viewed as masters. Indeed, other components may have portions that may be viewed as slaves. Global power controller 26 may have appropriate tables/registers that may help it keep track of the status (mater or slave) on device 10. Thus, for example, in an instance where core 1 14 is a master, core 1 14 may have global power controller 26 issue a SET_RESP signal for each slave that it interacts with. In one embodiment, SET_RESP signal may indicate to a slave module an appropriate response when it is in power gated mode. In one embodiment, the appropriate response may be that the slave module generates an error signal. In another instance, the appropriate response may be that the slave module wakes up, i.e., enters a non-power gated mode and performs any action requested by the master.

Figure 3:
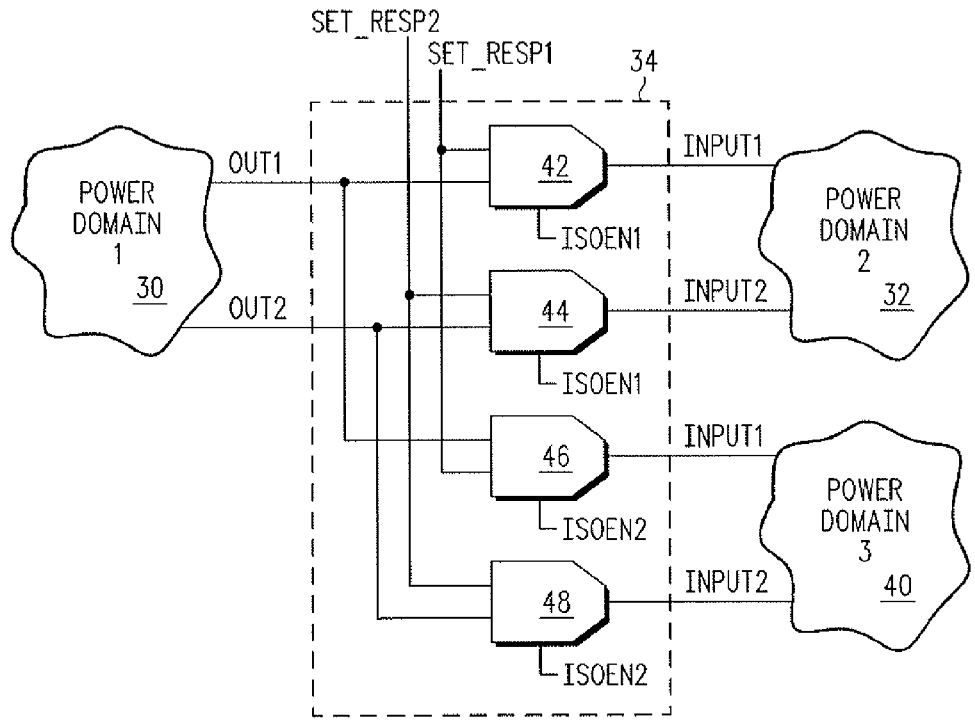
FIG. 3 is a block diagram of an embodiment of an isolation circuitry for use with the power management system of FIG. 2.
Figure 4:
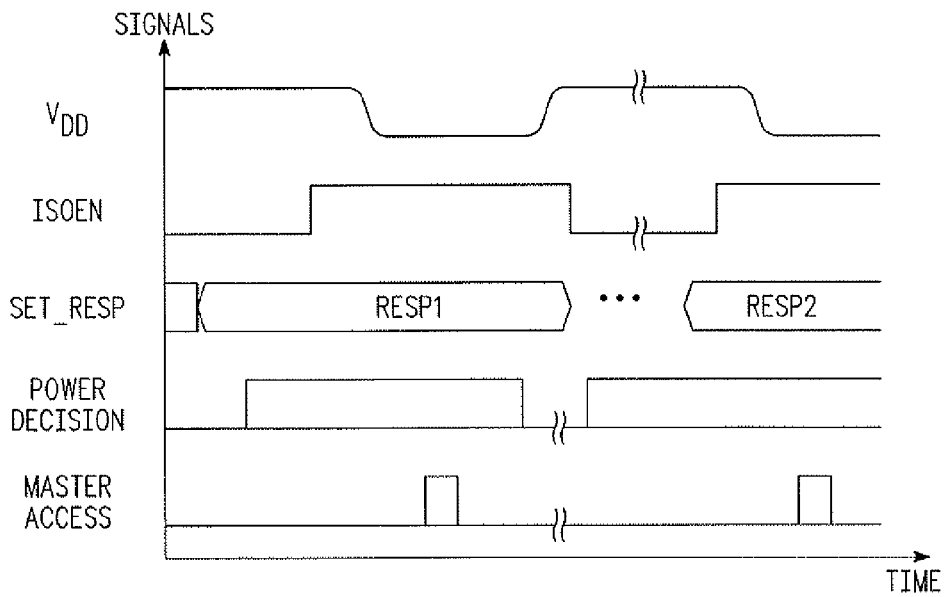
FIG. 4 is a timing diagram related to a set of signals associated with power management.
Figure 5:
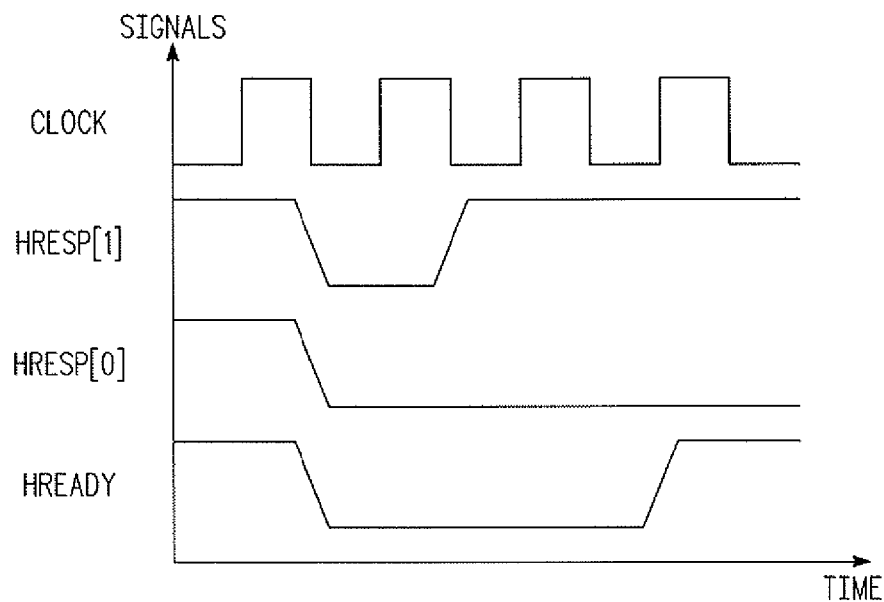
FIG. 5 is a timing diagram related to a set of signals associated with power management.

FIG. 3 is a block diagram of an embodiment of a of isolation circuitry 34 for use with the power management system of FIG. 2. Isolation circuitry 34 may be circuitry that is coupled between power domains, such that when the terminals of one of the power domains are in an unknown state or an undesirable state, the terminals of the other power domain can be placed in a known state. By way of example, isolation circuitry 34 may include multiplexers 42, 44, 46, and 48. In the exemplary embodiment shown, power domain 1 30 may provide OUT1 and OUT2 signals via corresponding terminals. OUT1 signal may be coupled to a first input of multiplexer 42 and a first input of multiplexer 46. OUT2 signal may be coupled to a first input of multiplexer 44 and a first input of multiplexer 48. Programmable signal values SET_RESP1 and SET_RESP2 may be received from global power controller 26. SET_RESP1 signal may be coupled to a second input of multiplexer 42 and may also be coupled to a second input of multiplexer 46. SET_RESP2 signal may be coupled to a second input of multiplexer 44 and may also be coupled to a second input of multiplexer 48. Based on the state of signal ISOEN1, multiplexer 42 may transfer OUT1 signal or SET_RESP1 signal to its output. Similarly, based on the state of signal ISOEN1, multiplexer 44 may transfer OUT2 signal or SET_RESP2 signal to its output. Likewise, based on the state of signal ISOEN2, multiplexer 46 may transfer OUT1 signal or SET_RESP1 signal to its output. Finally, based on the state of signal ISOEN2, multiplexer 48 may transfer OUT2 signal SET_RESP2 signal to its output. The output of multiplexer 42 may be coupled as signal INPUT1 to power domain 2 32 and the output of multiplexer 44 may be coupled as signal INPUT2 to power domain 2 32. The output of multiplexer 46 may be coupled as signal INPUT1 to power domain 3 40 and the output of multiplexer 48 may be coupled as signal INPUT2 to power domain 3 40. Using isolation circuitry 34, power domain 1 30 may be power gated from power domain 2 32 or power domain 3 40. Based on the status of isolation enable signals, FIG. 4 is a timing diagram related to a set of signals associated with power management using the various aspects discussed above. By way of example, based on POWER DECISION, global power controller 26 may generate SET_RESP signal. POWER DECISION may be a value stored in a register associated with global power controller 26. This value may be stored by software operating the integrated circuit. By way of example, SET_RESP signal may have at least two possible values. RESP1 may mean that when the module is accessed in power gated mode, it responds with an error. RESP 2 may mean that when the module is accessed in power gated mode, it responds with a wait and retry signal, indicating to the core that it is waking up. In another case, the module may respond by generating a sequence of events to indicate a wait or an error. As used herein, the term "power gated mode" includes, but is not limited to, a lower voltage than the normal operating voltage is being provided to the power domain. For example, in one embodiment, a power domain could be placed in a power gated mode by enabling high-impedance in the power supply path. Global power controller 26 may also generate ISOEN signal based on POWER DECISION. Next, global power controller 26 may change a value of the voltage coupled to the power domain (VDD), placing the power domain in active mode. Although FIG. 4 shows VDD being power gated, ground voltage VSS may also be power gated. By way of example, a master, such as a core, may initiate an access (referred to as MASTER ACCESS in FIG. 4) to a particular module. This access may be made when the power domain corresponding to that module is in a power gated mode. Based on the SET_RESP signal, global power controller 26 may exit the power domain corresponding to the module from the power gated mode. This may involve disabling the high impedance value, such that the relevant power domain can receive the normal operating voltage.

As shown FIG. 4, the software may make another power decision by resetting a value for POWER DECISION. In response to this, global power controller 26 may generate the SET_RESP signal. The SET_RESP signal may have a different value this time, i.e. RESP2, instead of RESP1. For example, the module may respond with a wait and retry signal, or it may respond by generating a sequence of events to indicate a wait or an error, instead of generating an error signal. Global power controller 26 may also generate ISOEN signal based on POWER DECISION. Next, global power controller may change a value of the voltage coupled to the power domain (VDD).

Figure 6:
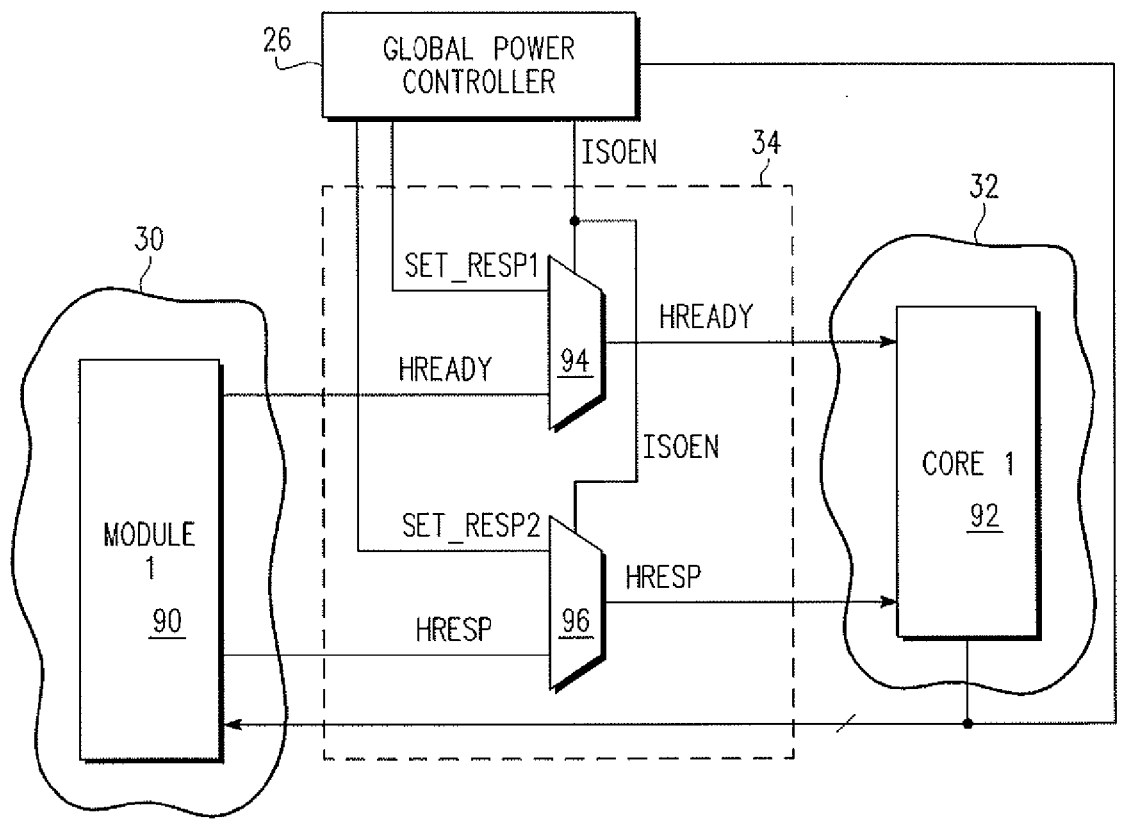
FIG. 6 is a block diagram showing additional details of another embodiment of a power management system.

FIG. 6 is a timing diagram related to a set of signals associated with power management related to various power domains. For example, module 1 90 may communicate with core 1 92 using the AMBA bus protocol. Using the HREADY signal, module 1 90 may indicate to core 1 92 that the data transfer has finished. HREADY signal may also be driven low by module 1 90 to extend a transfer. HRESP signal may be used to provide a status of the data transfer. For example, module 1 90 may indicate four different status of the data transfer: OKAY, ERROR, RETRY, and SPLIT. The HREADY signal line may be coupled to a first input of multiplexer 94 and to a first input of multiplexer 95. A second input of multiplexer 94 may receive SET_RESP1 signal and a second input of multiplexer 96 may receive SET_RESP2 signal. When ISOEN is enabled, SET_RESP1 signal may be coupled to the output of multiplexer 94. Similarly, when ISOEN is enabled, SET_RESP2 may be coupled to the output of multiplexer 96. Thus, during the power gated mode, global power controller 26 may provide HREADY and HRESP signals. This way, core 1 92 may receive either an OKAY signal, an ERROR signal, or a RETRY signal.

FIG. 6 is a block diagram showing additional details of another embodiment of a power management system. In this embodiment, global power controller 26 may be used in an environment where the core and the modules are communicating using the Advanced Microcontroller Bus Architecture (AMBA) Specification version 2 or derivatives thereof. In the example shown, combinations of multi-cycle signals are used to provide an error signal. Global power controller 26 may set HRESP[0], HRESP[1], and HREADY as shown in FIG. 6 to provide an ERROR signal to core 1 92. HRESP[1] may be set to indicate ERROR (HRESP[0]=0 and HRESP[1]=1) for two clock cycles. Core 1 92 samples the response when HREADY changes from low to high. In order to sample the ERORR response, HRESP signal should be stable for at least one clock cycle prior to the sampling. In this example, response signal, ERROR, for example, is a sequence of multi-bit values, wherein at least a portion of the response signal has different values (0 or 1, for example) in the sequence. In case, additional time is needed to indicate ERROR, wait states may be inserted. Although FIG. 6 shows specific examples of multi-cycle signals, other combinations of such signals may also be used.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

It is to be understood that the power management architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of device 10 are circuitry located on a single integrated circuit or within a same device. Alternatively, device 10 may include any number of separate integrated circuits or separate devices interconnected with each other. For example, memory 20 may be located on a same integrated circuit as core 1 14 and core 2 16 or on a separate integrated circuit. Also for example, device 10 or portions thereof may be soft or code representations of physical circuitry or of logical representations convertible into physical circuitry. As such, system 10 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In one embodiment, device 10 is a multi-core processor. Other embodiments may include different types of processors. Processors may be found in many forms including but not limited to mainframes, minicomputers, servers, workstations, personal computers, notepads, personal digital assistants, electronic games, automotive and other embedded systems, cell phones and various other wireless devices.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A circuit comprising:
a first power domain, the first power domain including a first set at least one terminal, the first set of at least one terminal configured for providing signals;
a second power domain, the second power domain including a second set of at least one terminal, the second set configured for receiving signals, the first power domain is power gatable with respect to the second power domain;
a controller circuit, the controller circuit having a third set of at least one terminal for providing programmable values; and
isolation circuitry having an input coupled to the first set of at least one terminal, a second input coupled to the third set of at least one terminal, and an output coupled to the second set of at least one terminal, the isolation circuitry including an input to receive an isolate signal, wherein the isolation circuit couples the first set of at least one terminal to the second set of at least one terminal to receive signals based on the isolation signal being in a first state and couples the third set of at least one terminal to the second set of at least one terminal to receive signals based on the isolation signal being at a second state.

2. The circuit of claim 1, wherein when the first power domain is in a power gated mode and the second power domain is in an active mode, the isolation signal is the second state.

3. The circuit of claim 1, wherein the first power domain includes a slave device, the first set of at least one terminal being a terminal of the slave device, the second power domain including a master device, the second set of terminals being a terminal of the master device.

4. The circuit of claim 3, wherein the second set of at least one terminal is configurable to receive a response signal, wherein at least a portion the response signal is provided by the controller via the isolation circuit when the isolation signal is in the second state.

5. The circuit of claim 4, wherein the response signal is a sequence of multi-bit values, wherein the at least a portion of the response signal provided by the controller has different values in the sequence.

6. The circuit of claim 1, wherein:
the second power domain includes a fourth set of at least one terminal, the fourth set of at least one terminal configured to provide signals;
the first power domain includes a fifth set of at least one terminal coupled to the fourth set of at least one terminal, the fifth set of at least one terminal receiving an access signal from the second power domain via the fourth set of at least one terminal indicating that circuitry of the second power domain desires access to circuitry of the first power domain;
wherein the controller includes a sixth set of at least one terminal, the sixth set of at least one terminal coupled to the fourth set of at least one terminal to receive the access signal from the second power domain.

7. The circuit of claim 1, wherein when the first power domain is in a power gated mode, the controller providing at least a portion of a response signal to the second set of at least one terminal via the isolation circuit in response to the controller receiving an access signal from circuitry of the second power domain.

8. The circuit of claim 1, wherein the third set of at a least one set of terminals is configurable to provide a first value at a first time when the isolation signal is in second state and to provide a second value with the isolation signal at the second state at a second time.

9. A method of operating a circuit, the method comprising:
operating in a first mode, wherein in the first mode, a first power domain operates in an active power mode and a second power domain operates in an active power mode, wherein in the first mode, a first set of at least one terminal of a first circuit of the first power domain are coupled to a second set of at least one terminal of a second circuit of a second power mode via an isolation circuit for providing signals from the first circuit to the second circuit; and operating in a second mode, wherein in the second mode, the first power domain operates in a power gated mode and a second power domain operates in an active power mode, wherein in the second mode, the second set of at least one terminal is coupled to a third set of at least one terminal via the isolation circuit, wherein the first set of at least one terminal is not coupled to the second set of at least one terminal via the isolation circuit, wherein when operating in the first mode, the third set of at least one terminal is not coupled to the second set of at least one terminal via the isolation circuit, and wherein when operating in the second mode, the third set of at least one terminal provides via the isolation circuit to the second set of at least one terminal a first value at a first time and a second value at a second time.

10. The method of claim 9, wherein the third set of at least one terminals are terminals of a controller, the controller provides an isolation signal to the isolation circuit for coupling and decoupling the first set of at least one terminal to the second set of at least one terminal.

11. The method of claim 9, wherein the third set of at least one terminal are a terminal of a controller, wherein when operating in the second mode, the controller monitors signals provided by the second circuit to determine when the second circuit is trying to access the first circuit, wherein the controller provides an indication signal to the second circuit via the third set of at least one terminal and the isolation circuit to the second circuit.

12. The method of claim 11, wherein the indication signal indicates an error to the second circuit.

13. The method of claim 11, wherein the indication signal indicates to the second circuit to retry the access to the first circuit.

14. The method of claim 11, further comprising:
when operating in the second mode, monitoring signals provided by the second circuit to determine when the second circuit is trying to access the first circuit,
in response to the second circuit trying to access the first circuit, placing the first power domain in an active mode and then placing the isolation circuit in a mode to couple the first set of at least one terminal to the second set of at least one terminal and to decouple the third set of at least one terminal from the second set of at least one terminal.

15. The method of claim 9 further comprising:
when operating in the second mode, monitoring signals by a controller, signals provided by the second circuit to determine when the second circuit is trying to access the first circuit, and
providing by the controller, the first value followed by the second value at the third set of at least one terminal in response to the second circuit trying to access the first circuit to indicate an error.

16. The method of claim 9 further comprising:
transitioning from the second mode to the first mode, wherein the transitioning includes placing the first power domain in an active mode and then placing the isolation circuit in a mode to couple the first set of at least one terminal to the second set of at least one terminal and to decouple the third set of at least one terminal from the second set of at least one terminal.

17. The method of claim 9 further comprising:
transitioning from the first mode to the second mode, wherein the transitioning includes placing isolation circuitry in a mode to couple the third set of at least one terminal to the second set of at least one terminal and to decouple the first set of at least one terminal from the second set of at least one terminal and then to place the first power domain in a gated power mode.

18. A method of operating a circuit, the method comprising:
operating in a first mode, wherein in the first mode, a first power domain of the circuit operates in an active power mode and a second power domain of the circuit operates in an active power mode, wherein in the first mode, a first set of at least one terminal of a first circuit of the first power domain are coupled to a second set of at least one terminal of a second circuit of the second power domain via an isolation circuit for providing signal values from the first circuit to the second circuit;
transitioning from the first mode to a second mode, wherein the transitioning includes placing the isolation circuit in a mode to couple a third set of at least one terminal to the second set of at least one terminal and to decouple the first set of at least one terminal from the second set of at least one terminal and then placing the first power domain in a gated power mode;
operating in the second mode, wherein in the second mode, the first power domain operates in the gated power mode and a second power domain operates in an active power mode, wherein in the second mode, the second set of at least one terminal is coupled to the third set of at least one terminal via the isolation circuit, wherein the first set of at least one terminal is not coupled to the second set of at least one terminal via the isolation circuit;
wherein when operating in the first mode, the third set of at least one terminal is not coupled to the second set of at least one terminal via the isolation circuit;
wherein when operating in the second mode, providing by the third set of at least one terminal via the isolation circuit to the second set of at least one terminal a first value at a first time and a second value at a second time;
transitioning from the second mode to the first mode, wherein the transitioning includes placing the first power domain in an active mode and then placing the isolation circuit in a mode to couple the first set of at least one terminal to the second set of at least one terminal and to decouple the third set of at least one terminal from the second set of at least one terminal.

19. The method of claim 18, wherein:
when operating in the second mode, monitoring signals provided by the second circuit to determine when the second circuit is trying to access the first circuit,
in response to the second circuit trying to access the first circuit, providing an indication signal to the second set of at least one terminal by the third set of at least one terminal via the isolation circuit.

* * * * *